United States Patent Office.

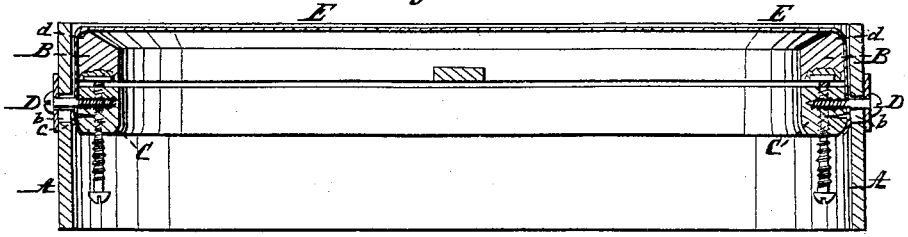
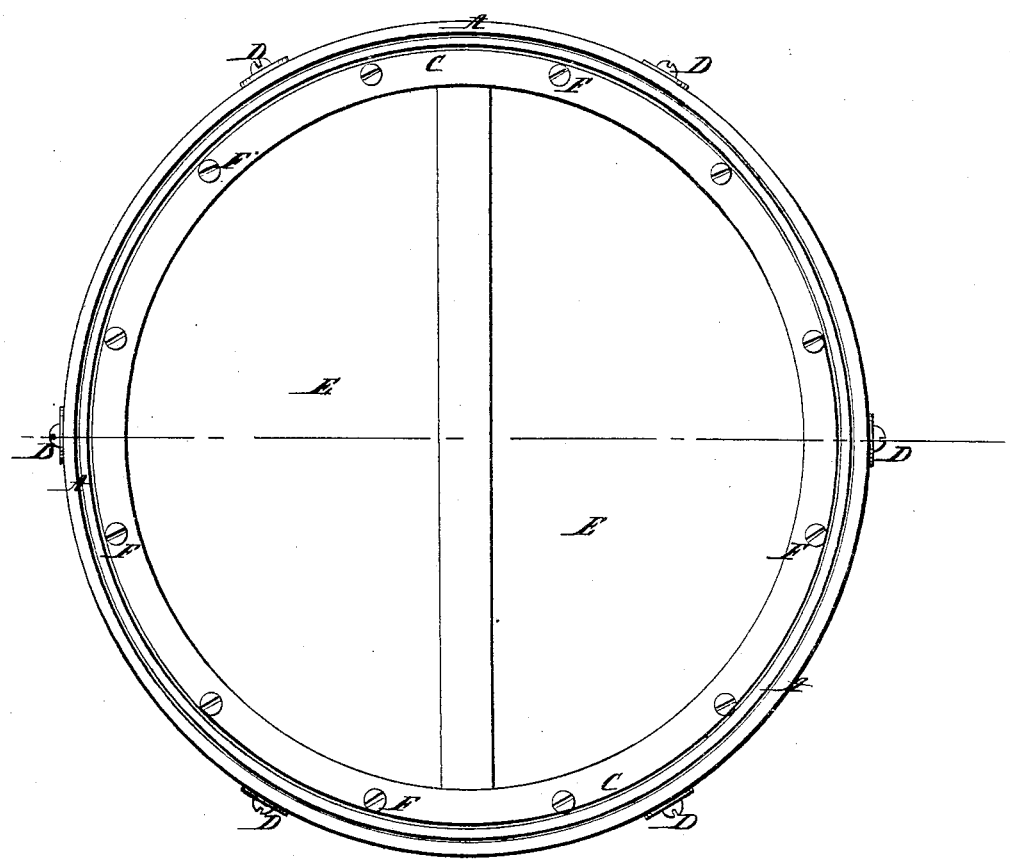

WILLIAM B. TILTON, OF NEW YORK, N. Y., ASSIGNOR TO W. NASH, OF SAME PLACE.

IMPROVEMENT IN BANJOS.

Specification forming part of Letters Patent No. 54,264, dated April 24, 1866.

*To all whom it may concern:*

Be it known that I, WILLIAM B. TILTON, of the city, county, and State of New York, have invented new and useful Improvements in Banjos; and I do hereby declare that the following is a full, clear, and exact description thereof, which will enable others skilled in the art to make and use the same, reference being had to the accompanying drawings, forming a part of this specification.

The present invention relates to the mode of securing the parchment head of a banjo to and within its rim; and it principally consists in the use of two annular rings placed one upon the other within the banjo rim or cylinder, the outer one being loose therein and the inner one made fast thereto, with the edge of the parchment head secured to it in any proper manner, passing around the edge of the outer ring and between it and the banjo-rim, said inner ring being provided with a series of set-screws bearing against the outer ring, by turning which in the proper direction the said rings will be pressed apart, or, in other words, the outer ring made to move away from the inner ring, thus drawing or straining and holding the parchment head to any degree of tension desired, which tension upon the parchment head can be released, when so desired, by simply turning the said screws in the opposite direction; and it also consists in so securing the inner ring, to which the parchment head is fastened, within the banjo-rim that it can be adjusted in position at pleasure, so that the parchment head can be brought entirely below the edge of the banjo-rim and within the same, or made to project beyond the rim, according as may be desired.

In accompanying plate of drawings my improvements are illustrated, Figure 1 being a central vertical section through a banjo with its parchment head secured therein according to my invention, and Fig. 2 a view of the under side of the banjo.

Similar letters of reference indicate like parts.

A in the drawings represents the rim or cylinder of the banjo, which may be made of any of the materials ordinarily used therefor; B and C, two annular rings placed within the banjo-rim A, one upon the other, the outer one, B, being loose therein and the inner one, C, made fast thereto by means of a series of set-screws, D, passing through vertical slots *b* of the said rim; E, the parchment head, secured at its edge, by means of tacks *c* or in any other proper manner, to the inner ring, C, of the two annular rings B and C, before referred to, passing around the outer edge, *d*, of the outer ring, B, between it and the banjo-rim, as plainly shown in Fig. 1 of the drawings; F, a series of set-screws inserted in the inner ring, C, and bearing by their inner ends against the edge of the outer ring, B, next to the inner one, C, by turning which screws in the proper direction the said ring will be pressed apart, or, in other words, the outer ring, B, made to move away from the inner one, C, thus drawing or straining or holding the parchment head E, secured to the inner ring, C, as explained, to any desired degree of tension, the tension upon the parchment head being released by simply turning the said set-screws F in the proper direction to allow the loose or outer ring, B, to move toward the inner or fixed one, C, as is manifest without further explanation.

By securing the inner ring, C, to the banjo-rim A by means of set-screws D passing through vertical slots *b* of the rim, it is obvious that by turning the said set-screws in the proper direction the said ring C can be loosened within the banjo-rim A sufficiently to allow it, in connection with the other ring B and the parchment head, to be so moved as to set the parchment head so that it will project more or less from the edge of the banjo-rim, or be entirely within and below the same, when, then tightening the said screws, it can be secured in such position, the advantages of which are plainly apparent to all conversant with the use of banjos.

I claim as new and desire to secure by Letters Patent—

1. Securing the parchment head to and within the cylinder or rim of a banjo or other similar musical instrument by means of two annular rings, B and C, when arranged together and with regard to the parchment head and the banjo-rim so as to operate substantially in the manner described and for the purpose specified.

2. So arranging or securing the ring C, to which the parchment head is fastened, within the banjo-rim that it can be adjusted in position, substantially as and for the purpose described.

WM. B. TILTON.

Witnesses:
M. M. LIVINGSTON,
ALEX. F. ROBERTS.